United States Patent
Gillis et al.

(10) Patent No.: US 6,683,743 B2
(45) Date of Patent: Jan. 27, 2004

(54) METHOD FOR CONTROLLING THE VELOCITY OF AN ACTUATOR ARM IN A HARD DISK DRIVE

(75) Inventors: Donald Ray Gillis, San Jose, CA (US); Mike Suk, San Jose, CA (US); Kris Victor Schouterden, Los Gatos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 407 days.

(21) Appl. No.: 09/758,415

(22) Filed: Jan. 10, 2001

(65) Prior Publication Data

US 2002/0089775 A1 Jul. 11, 2002

(51) Int. Cl.[7] .......................... G11B 21/02; G11B 5/596
(52) U.S. Cl. ....................................... 360/75; 360/78.06
(58) Field of Search ............... 360/75, 78.06, 360/78.08, 78.04; 29/603.03

(56) References Cited

U.S. PATENT DOCUMENTS

| 4,697,127 A | | 9/1987 | Stich et al. ................. 318/561 |
|---|---|---|---|
| 5,124,867 A | * | 6/1992 | Kitahori et al. .......... 360/256.1 |
| 5,646,797 A | | 7/1997 | Kadlec et al. ................. 360/75 |
| 5,926,340 A | | 7/1999 | Sim ........................ 360/78.09 |
| 6,145,188 A | * | 11/2000 | Brooks, Jr. et al. ...... 29/603.03 |
| 6,353,510 B2 | * | 3/2002 | Drouin ........................ 360/75 |

\* cited by examiner

Primary Examiner—Andrew L. Sniezek
(74) Attorney, Agent, or Firm—John L. Rogitz

(57) ABSTRACT

A method for controlling the velocity of an actuator arm in a hard disk drive includes moving the actuator arm to an inner limit or outer limit of motion. Then the power to the actuator coil, which drives the actuator arm, is reduced to zero and the actuator arm is released. Bends in the flexible cable connected to the actuator arm can cause the actuator arm to move toward the outer limit of motion. As the actuator arm moves due to the flexible cable, the velocity contribution of the flexible cable is measured and stored. Thereafter, the velocity of the actuator arm, during emergency power shut off, normal unload of the disk drive, or normal load of the disk drive, is decreased or increased by an amount equal to the cable-induced velocity to compensate for the velocity contribution of the flexible cable.

19 Claims, 2 Drawing Sheets

METHOD FOR CONTROLLING THE VELOCITY OF AN ACTUATOR ARM IN A HARD DISK DRIVE

BACKGROUND OF THE INVENTION

1. Field of the Invention

The present invention relates generally to actuator arms found in hard disk drives.

2. Description of the Related Art

A hard disk drive includes a storage disk having a read/write surface and an actuator arm supporting a read/write head. In a load/unload disk drive, as the read/write head moves towards the outer diameter of the storage disk, a tab on the actuator arm slides up a ramp placed just outside the outer periphery of the storage disk. As the tab slides up the ramp, the read/write head is lifted away from the read/write surface. Thus, when the read/write head is loaded, i.e., when it is desired to read or write data, the head is loaded on to the disk, meaning that the tab slides down the ramp allowing the read/write head to move very close to the read/write surface. The head then moves across the surface of the storage disk to write data to and read data from the disk.

Conversely, when the read/write head is unloaded, the tab slides into a detent formed in the ramp such that it is "parked" on the ramp. A flexible cable is attached between the actuator arm assembly and to the arm electronics module allowing data to be transmitted to and from the disk drive.

During normal unload, or emergency power shut-off, a voice coil motor (VCM) biases the actuator arm toward an outer motion-limiting crash stop. If the actuator arm moves too quickly towards the outer crash stop, it may rebound off the crash stop, preventing the tab from seating in the detent, and causing the read/write head to land back onto the disk at uncontrolled speeds that are usually higher than the designed speed. In order to prevent damage to the disk surface and read/write head, it is desirable to reduce the rebound so that the tab stays within the detent of the ramps. For this reason, the speed at which the VCM biases the actuator arm toward the outer crash stop ordinarily is constrained so that it is below a maximum threshold, e.g., four hundred and fifty millimeters per second (450 mm/s). It has been observed, however, that the bend in the flexible cable can further contribute to the speed at which the actuator arm moves toward the outer motion-limiting crash stop, hence potentially causing the arm to move too fast toward the crash stop and resulting in rebound that pushes the read/write head back onto the disk surface.

The present invention accordingly recognizes that there currently is a need to account for the velocity contribution of the flexible cable.

SUMMARY OF THE INVENTION

A method for establishing a corrected velocity of an actuator arm in a disk drive during unloading of the actuator arm includes determining a velocity contribution of a flexible cable connected to an actuator arm. Then, the velocity contribution of the flexible cable is combined with a variable velocity contribution from an actuator coil to render a corrected velocity between a predetermined minimum velocity and a predetermined maximum velocity. The corrected velocity is used to move the actuator arm during unloading of the drive, during emergency shut-down of the drive, or during loading of the drive.

In a preferred embodiment, the velocity contribution of the flexible cable is determined by moving the actuator arm to, or near, an inner motion limit. Then, an actuator coil, which is used to move the actuator arm, is deenergized and the actuator is released. As the arm moves under the influence of the flexible cable, its velocity is measured near the outer diameter of the disk to yield the velocity contribution of the flexible cable. In a preferred embodiment, the corrected velocity of the actuator is established by establishing a reduced power to the actuator coil. It is possible that the contribution from the flex cable could be in the opposite direction, such that, the bias moves the actuator towards the inner diameter of the disk. In this case, the power to the actuator coil must be increased. Preferably, the method of the present invention is performed during testing of the disk drive before it is shipped to a user, but it may also be performed periodically over the life of the disk drive.

In another aspect of the present invention, a disk drive includes a disk and an actuator arm. The disk drive also includes a read/write head that is supported by the actuator arm. A flexible cable is attached to the actuator arm and an actuator coil is also connected to the actuator arm. Accordingly, the actuator coil is used to drive the actuator arm. In this aspect of the present invention, the disk drive includes a control circuit that includes means for establishing a corrected velocity of the actuator arm to be used during unloading of the disk drive.

In yet another aspect of the present invention, a method for measuring a velocity contribution of a flexible cable in a disk drive includes moving an actuator arm to a motion limit, e.g., an inner motion limit or an outer motion limit. Then, an actuator coil, which is connected to the actuator arm, is deenergized and the actuator arm is released. As the actuator arm moves under the influence of the flexible cable, a parameter representative of actuator arm motion is measured. A corrected velocity of the actuator arm is established based on the parameter.

The present invention will now be described, by way of example, with reference to the accompanying drawings, in which:

DESCRIPTION OF AN EMBODIMENT OF THE INVENTION

Figure 1:
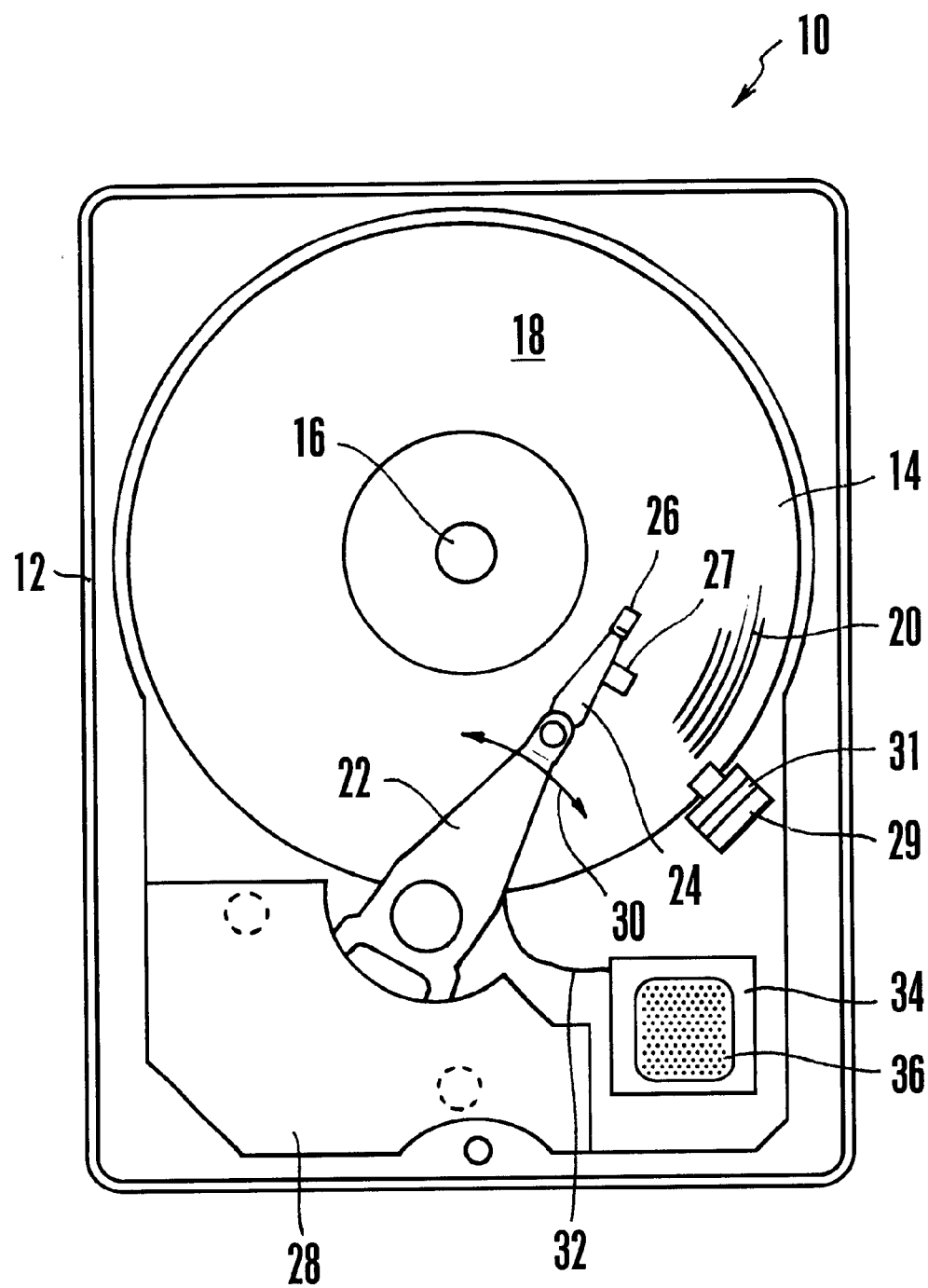
FIG. 1 is a top plan view of a disk drive in which the present invention is used to control the velocity of the actuator arm.

Referring initially to FIG. 1, a disk drive is shown and generally designated 10. FIG. 1 shows that the disk drive 10 includes a housing 12. Within the housing 12 is at least one disk 14 mounted on a spindle 16. Furthermore, the disk 14 includes a read/write surface 18 having plural concentric data tracks 20. As shown in FIG. 1, the disk drive 10 also includes an actuator arm 22. A suspension arm 24 extends from the actuator arm 22 and supports a read/write head 26. The actuator arm 22 is driven by an actuator coil 28, e.g., a voice coil motor (VCM), and as the actuator arm 22 pivots back and forth, as indicated by arc 30, the read/write head 26 moves across the data tracks 20 of the disk 14.

FIG. 1 shows a tab 27 that extends from the suspension arm 24 and a ramp 29 placed just outside the outer periphery of the disk 14. As the actuator arm 22 moves toward the outer periphery of the disk 14, the tab 27 slides up the ramp 29 causing the read/write head 26 to be lifted away from the read/write surface 18 of the disk 14. The ramp 29 is formed with a detent 31 into which the tab 27 seats in order to hold the suspension arm 24 on the ramp 29.

As shown in FIG. 1, a flexible cable 32 connects the read/write head 26 to a circuit board 34. The circuit board 34 includes a control circuit 36 that is connected to the actuator coil 28. As the read/write head 26 moves across the data tracks 20, in either direction, the bend in the flexible cable 32 and air drag can provide a force on the actuator arm 22.

During emergency power shut-off, normal unload, or normal load of the disk drive 10, when the actuator arm 22 is moved by the actuator coil 28, the bend in the flexible cable 32 contributes to the velocity, $V_{act}$, of the actuator arm 22. Thus, to maintain the velocity of the actuator arm 22 below a maximum threshold, or above a minimum threshold, the power to the actuator coil 28 must be altered, as described in detail below, to account for the velocity contribution of the flexible cable 32, $V_{flex}$. If the bend in the flexible cable 32 biases the actuator arm 22 towards the inner radius of the disk 14, then, during emergency shut down or normal unload, the power must be increased. On the other hand, if the bend in the flexible cable 32 biases the actuator arm 22 toward the outer radius of the disk 14 the power must be decreased during emergency shut down or normal unload.

The method for controlling the velocity of the actuator arm 22, disclosed below, may be executed as a series of instructions by a digital processor on the circuit board 34. These instructions may reside, for example, in the control circuit 36 of the circuit board 34, which, when programmed with the present logic, establishes a computer program product.

Alternatively, the instructions may be contained on a data storage device with a computer readable medium, such as a computer diskette having a data storage medium holding computer program code elements. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code and/or micro-code. As yet another equivalent alternative, the logic can be embedded in an application specific integrated circuit (ASIC) chip or other electronic circuitry.

Figure 2:
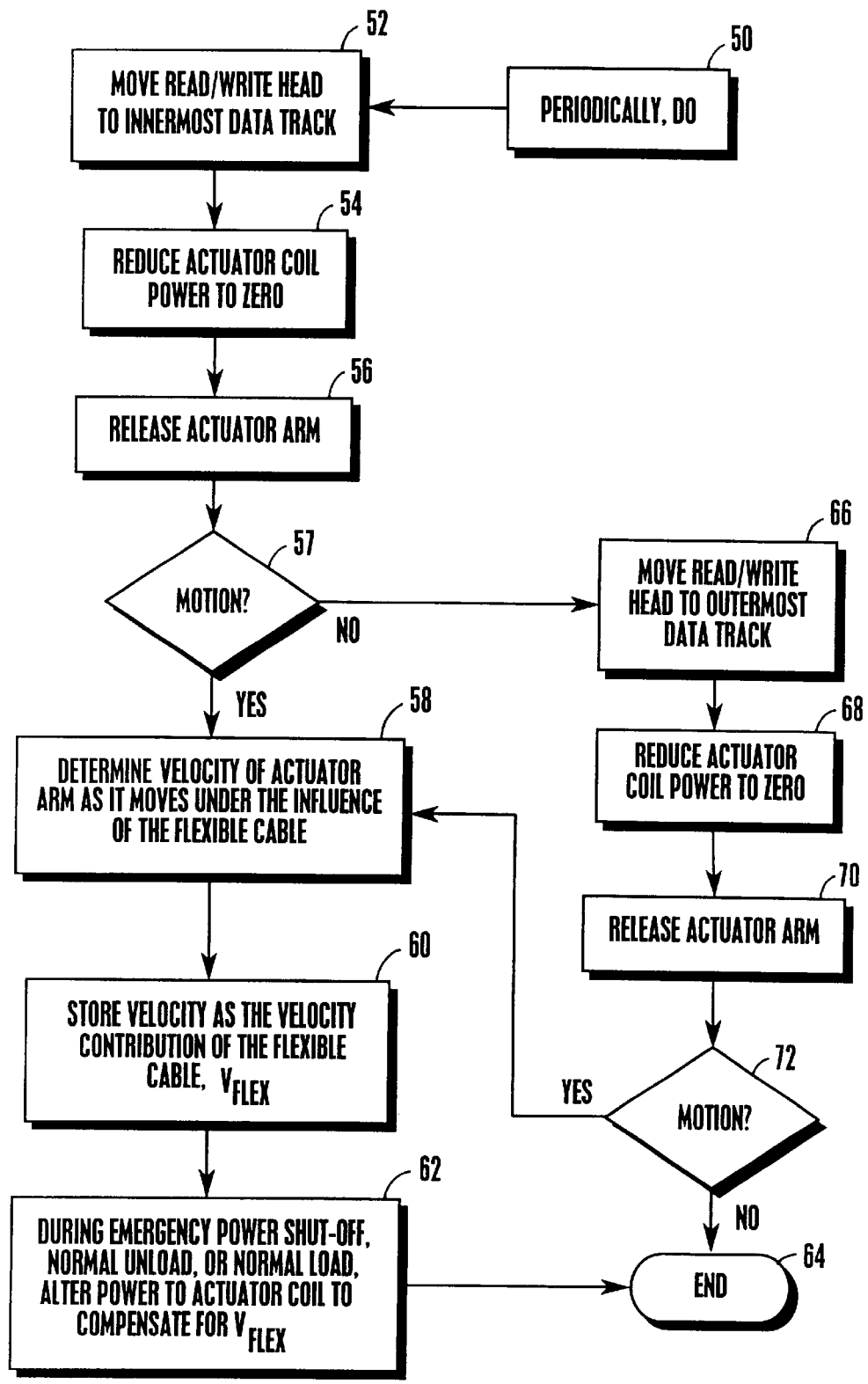
FIG. 2 is a flow chart showing the control logic of the present invention.

Referring now to FIG. 2, the velocity control logic of the present invention can be seen. Commencing at block 50, a do loop is presented, i.e., periodically the succeeding steps are followed. Proceeding to block 52, the read/write head is moved to the innermost data track 20. Then, at block 54, the power to the actuator coil 28 is reduced to zero. At block 56, the actuator arm 22 is released. Thereafter, at decision diamond 57, it is determined whether the actuator arm 22 moves toward the ramp 29 under the influence of the flexible cable 32. If so, the logic continues to block 58 where, as the actuator arm 22 moves under the influence of the flexible cable 32, the velocity of the actuator arm 22 is determined as it approaches the ramp 29.

In one preferred, non-limiting embodiment, the velocity of the actuator arm 22 is determined by reading the back-electromotive force of the actuator coil 28 as the actuator arm 22 moves under the influence of the flexible cable 32. Since the actuator coil 28 is not powered, the motion of the actuator arm 22 can be attributed to the bend in the flexible cable 32. Air drag of the actuator arm 22 and flexible cable 32 can also contribute, but the motion is dominated by the contribution of the bend in the flexible cable 32. Therefore, at block 60, the velocity measured at block 58 is stored as the velocity contribution due to the flexible cable 32, $V_{flex}$. Thereafter, during emergency power shut-off or normal unload of the disk drive 10, the predetermined power to be applied to the actuator coil 28 is altered by subtracting from it the power necessary to offset $V_{flex}$. On the other hand, during normal load of the disk drive 10, the power to the actuator coil 28 is altered by adding to it the power necessary to offset $V_{flex}$. Hence, the power to the actuator coil 28 is established to ensure that the arm moves at about the safe velocity. The logic then ends at state 64.

If, at decision diamond 57, the actuator arm 22 does not move toward the ramp 29 under the influence of the flexible cable, the logic moves to block 66. At block 66, the read/write head is moved to the outermost data track 66. Then, at block 68, the power to the actuator coil 28 is reduced to zero. Proceeding to block 70, the actuator arm 22 is released. Moving to decision diamond 72, it is determined whether the actuator arm 22 moves toward the innermost data track under the influence. If not, the logic ends at state 64.

If so, the logic continues to block 58 where, as the actuator arm 22 moves under the influence of the flexible cable 32, the velocity of the actuator arm 22 is determined as it moves a short distance, e.g. two to five millimeters (2–5 mm), toward the spindle 16. Then, moving to block 60, the velocity measured at block 58 is stored as the velocity contribution due to the flexible cable 32, $V_{flex}$. Thereafter, during emergency power shut-off or normal unload of the disk drive 10, the predetermined power applied to the actuator coil 28 is altered by adding to it the power contribution to account for $V_{flex}$. On the other hand, during normal load of the disk drive 10, the power to the actuator coil 28 is altered by subtracting from it the power necessary to offset $V_{flex}$. Thus, the power to the actuator coil 28 is established to ensure that the actuator arm 22 moves at about the safe velocity.

It is to be understood that the velocity contribution of the flexible cable, $V_{flex}$, is combined with a variable velocity contribution of the actuator coil 28 to render a corrected velocity, $V_{cor}$, that is between a predetermined minimum velocity and a predetermined maximum velocity. In a preferred embodiment, the maximum threshold for the return velocity of the actuator arm 22, i.e., toward the ramp 29, is four hundred and fifty millimeters per second (450 mm/s) measured at the read/write head 26. Therefore, if the velocity contribution of the flexible cable, $V_{flex}$, is determined, e.g., to be forty-five millimeters per second (45 mm/s), in the direction of the ramp 29, the power to the actuator coil 28 during emergency power shut-down, or normal unload of the disk drive is reduced. In the absence of $V_{flex}$, this reduced power would result in an actuator arm 22 velocity, $V_{act}$, of about four hundred and five millimeters per second (405 mm/s). Thus, when combined with $V_{flex}$, the corrected actuator arm velocity, $V_{cor}$, is four hundred and fifty millimeters per second (450 mm/s).

It is to be understood that the above disclosed logic preferably is undertaken while the disk drive 10 is being tested after it is manufactured. Moreover, the above steps are performed periodically during the operation of the disk drive 10 when the disk drive 10 is idle. Thus, any changes in the mechanical behavior of the flexible cable 32 can be accounted for over the life of the disk drive 10.

With the configuration of structure described above, it is to be appreciated that the method for controlling the velocity of an actuator arm in a hard disk drive provides a method for effectively altering the velocity, $V_{act}$, of the actuator arm 22 in order to compensate for the velocity contribution of the flexible cable, $V_{flex}$, and render a corrected actuator arm velocity, $V_{cor}$.

While the particular METHOD FOR CONTROLLING THE VELOCITY OF AN ACTUATOR ARM IN A HARD DISK DRIVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A method for establishing a corrected velocity of an actuator arm in a disk drive during unloading of the actuator arm, comprising the acts of:
    determining a velocity contribution of a flexible cable connected to an actuator arm;
    combining the velocity contribution of the flexible cable with a velocity contribution from an actuator coil to render a corrected velocity between a predetermined minimum velocity and a predetermined maximum velocity; and
    programmatically using the corrected velocity to establish a power level to the coil.

2. The method of claim 1, wherein the corrected velocity is used to move the arm to an outer motion limit during emergency shut down.

3. The method of claim 1, wherein the corrected velocity is used to move the arm to an inner motion limit during normal load of the drive.

4. The method of claim 1, further comprising the acts of:
    moving the actuator arm to an inner limit;
    deenergizing an actuator coil, the actuator coil being used to move the actuator arm; and
    releasing the actuator arm.

5. The method of claim 1, wherein the corrected velocity of the actuator arm is used to programmatically reduce power to the actuator coil.

6. The method of claim 1, wherein the corrected velocity of the actuator arm is used to programmatically increase power to the actuator coil.

7. The method of claim 1, further comprising the acts of:
    moving the actuator arm to an outer limit;
    deenergizing, an actuator coil, the actuator coil being used to move the actuator arm; and
    releasing the actuator arm.

8. The method of claim 7, wherein the corrected velocity of the actuator arm is used to programmatically reduce power to the actuator coil.

9. The method of claim 7, wherein the corrected velocity of the actuator arm is used to programmatically increase power to the actuator coil.

10. The method of claim 1, wherein the method is performed during testing of the disk drive before it is shipped to a user.

11. The method of claim 10, wherein the method is further performed periodically over the life of the disk drive.

12. A disk drive, comprising:
    at least one disk;
    at least one actuator arm;
    at least one read/write bead supported by the actuator arm;
    at least one ramp placed near the outer periphery of the disk;
    at least one flexible cable attached to the read/write head;
    at least one actuator coil connected to the actuator arm, the actuator coil being used to drive the actuator arm; and
    at least one control circuit, the control circuit including means for determining a velocity contribution of the cable to be used to programmatically alter power to the coil during unloading of the disk drive.

13. The disk drive of claim 12, wherein the means for determining comprises:
    means for moving the actuator arm to an inner motion limit;
    means for deenergizing the actuator coil;
    means for releasing the actuator arm; and
    means for determining the velocity contribution of the flexible cable.

14. The disk drive of claim 12, wherein the means for determining comprises:
    means for moving the actuator arm to an outer limit;
    means for deenergizing the actuator coil; and
    means for releasing the actuator arm.

15. The disk drive of claim 12, wherein the velocity is established during testing of the disk drive before it is shipped to a user.

16. The disk drive of claim 15, wherein the velocity is further established periodically over the life of the disk drive.

17. The disk drive of claim 12, further comprising:
    means for determining a corrected velocity at least partially based on a velocity contribution of the flexible cable.

18. The method of claim 12, wherein the velocity is used during emergency shutdown of the disk drive.

19. The method of claim 12, wherein the velocity is used during loading of the disk drive.

* * * * *